Nov. 26, 1974     D. S. BRYAN     3,851,067
PREPARED CITRUS FRUIT HALVES AND METHOD OF MAKING THE SAME
Filed Jan. 8, 1973
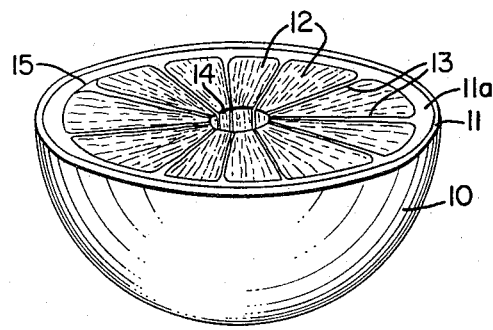
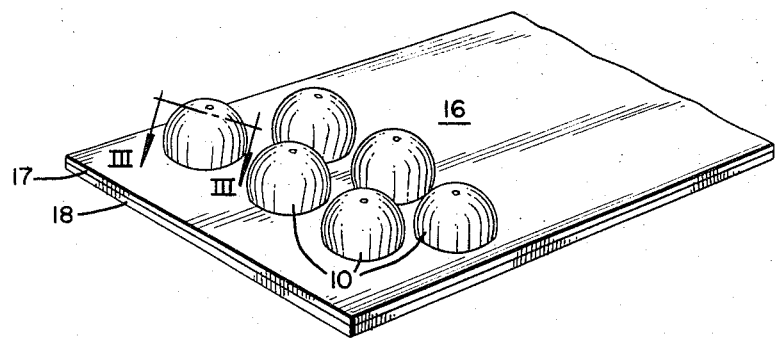
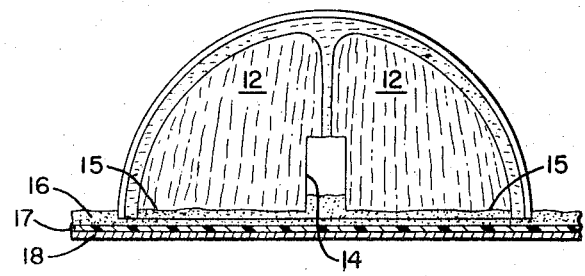

United States Patent Office 3,851,067
Patented Nov. 26, 1974

3,851,067
PREPARED CITRUS FRUIT HALVES AND
METHOD OF MAKING THE SAME
Don S. Bryan, % Lake Garfield Nurseries Company,
P.O. Box 154, Bartow, Fla. 33830
Continuation-in-part of application Ser. No. 129, Jan. 2,
1970, now Patent No. 3,707,383. This application Jan.
8, 1973, Ser. No. 321,582
Int. Cl. A23b 7/16
U.S. Cl. 426—90     14 Claims

ABSTRACT OF THE DISCLOSURE

A prepared, edible citrus half of increased shelf life and a method of preparing the same are provided comprising a citrus half including the rind, said citrus half having a cut face embedded in a layer of edible gel carried on a flat non-absorbent platen, said gel layer comprising an edible hydrophilic colloid. The method comprises generally applying a layer of edible hydrophilic colloid to a flat non-absorbent surface and placing the citrus fruit half cut face down in the gel while warm and fluid and immediately cooling to set the gel.

---

This application is a continuation-in-part of my copending application Ser. No. 129, filed Jan. 2, 1970, now U.S. Pat. No. 3,707,383.

This invention relates to a prepared citrus half and method of preparing citrus fruit halves and particularly to a method of preparing gel-coated citrus halves, such as grapefruit halves, which can be shipeed along distances without drying out or losing flavor or juices.

Many attempts have been made to precut and ship citrus halves such as grapefruit. Prior to my invention, disclosed in application Ser. No. 129, these prior art attempts have been generally unsuccessful for a variety of reasons. In general, such prior prepared citrus halves have dried out, lost moisture and have had a less than satisfactory appearance. As a result, there have been no satisfactory commercial prepared citrus halves on the market having a satisfactory shelf life, prior to my invention. While the practice disclosed in my application Ser. No. 129 solved these prior art problems, there are instances where the coatings have been damaged in shipment resulting in loss of moisture.

The present invention provides a method for preparing and handling citrus fruit halves which reduces the possibility of damage in handling. The citrus fruit halves are coated with the same edible coating of application Ser. No. 129. It stays soft, holds the moisture in the fruit, does not crack or separate from the fruit rind and may be easily removed if desired.

In a preferred embodiment of my invention, I provide a prepared, shippable, edible citrus half including the rind, said citrus half having a cut face, resting in a layer of edible hydrophilic colloid gel carried on a light, rigid platen. Preferably, the hydrophilic colloid gel is a galactan based material such as low methoxy pectin, admixed with an edible material gum such as locust bean gum. Preferably, the gel is formed in citrus juice to which may be added a sweetener such as sugar, a cyclomate, saccharine or the like and a carrageenan. The citrus half is cut adjacent the junction of the albedo and segments to a depth between about one-eighth and about one-half of an inch, preferably about a quarter inch and at the junction of the core and segments to a depth down to albedo but preferably at a diameter sufficient to remove the core and seeds of up to about one-half inch. The core portion which is cut is preferably removed. The cavity or cut is filled with the gel mixture when the half is coated. The citrus half is then placed cut face down in a layer of gel carried on a sheet or platen such as plastic, plastic coated paper board or similar material and shipped and stored at a temperature of about 33° to 40° F.

The cut surfaces of the citrus halves are preferably sterilized with steam or hot water spray at sterilizing temperature in order to destroy or reduce enzymatic action prior to inserting into the gel layer.

In the foregoing general description of my invention, I have set out certain objects, purposes and advantages of my invention. Other objects, purposes and advantages of this invention will be apparent from a consideration of the following description and the accompanying drawings in which, FIG. 1 is an isometric view of a grapefruit half according to my invention;

FIG. 2 is an isometric view of grapefruit halves prepared according to my invention; and FIG. 3 is a fragmentary section on the line III—III of FIG. 2.

Referring to the drawings, I have illustrated a half grapefruit 10 having a rind 11 and albedo 11a and a plurality of segments 12 separated from one another by membranes 13 extending from albedo 11a to core 14 at the center. The upper portion of the core 14 is cut away from segments 12 and membranes 13 and is preferably removed if seeds are present. A cut line 15 about one-quarter inch deep runs around the inside of the cut face adjacent the albedo.

The grapefruit halves were prepared by washing, waxing and sizing whole grapefruit and then cutting them in half transverse to the core. The upper portion of the core was removed and a ¼ inch cut made around the grapefruit between the albedo and section. The grapefruit halves were drained for 5 minutes, then sprayed with steam on the cut surfaces and placed face down in a layer of gel 16 carried on a plastic surface 17 of corrugated paper board sheet 18. The gel at the time of inserting the grapefruit halves is preferably about 165° to 180° F. and the whole assembly subjected to cooling immediately after the grapefruit halves are inserted.

The gel formulations set out in the following examples are typical of those which may be used in practicing my invention. They are the same as those disclosed in my application Ser. No. 129.

EXAMPLE I

A gel mix was prepared as follows:

|  | Percent |
|---|---|
| Low methoxyl pectin | 80 |
| Locust beam gum | 20 |

These materials were admixed and dispersed in grapefruit juice according to the following formulation:

|  | Percent |
|---|---|
| Gel mix above | 1.5 |
| Grapefruit juice | 98.18 |
| Calcium cyclamate | 0.15 |
| Oil essence emulsion | 0.17 |

The gel was dispersed in the grapefruit juice at room temperature in a jacketed vessel and then heated to 180° F. The calcium cyclamate was heated with a small amount of grapefruit juice just below the boiling point and added slowly to the hot dispersed mix in the kettle. The temperature of the kettle was dropped to 170° F. and the grapefruit oil essence emulsion was added. The mix was then transferred to a jacketed Simplex Model A filler and the temperature maintained by circulating hot water through the jacket at 170° F. The hot gel mix was spread over the entire surface of a plastic surface board 18 (approximately 11″ x 17″) by spraying onto the plastic surface 17 with the board carried on a continuous belt 20. The board 18 is carried to a loading station 21 where the grapefruit halves are inserted into the layer of gel 16 after which they are carried to a cooling area 22, cooled to solidify the gel and prepared for shipment.

EXAMPLE II

The gel mix of Example I was dispersed in grapefruit juice according to the following formulation:

|  | Percent |
|---|---|
| Gel mix of Example I | 1.3 |
| Grapefruit juice | 78.51 |
| Calcium chloride (anhyd.) | 0.02 |
| Sugar | 10 |
| Honey | 10 |
| Oil essence emulsion | 0.17 |

The gel mix was dispersed in the grapefruit juice as in Example I and heated to 180° F. The sugar and honey were added and the temperature stabilized at 170° F., the oil essence emulsion was added and the mix transferred to the jacketed Simplex Model A filler. Grapefruit were then handled as in Example I.

EXAMPLE III

A gel mix was prepared as follows:

|  | Percent |
|---|---|
| Low methoxyl pectin | 36.95 |
| Locust bean gum | 18.51 |
| Carrageenans (Gelcarin FC) | 22.27 |
| Carrageenans (Gelcarin DG) | 22.27 |

The Gelcarin FC and Gelcarin DG are carrageenans extracted from sea weed and sold under the above trade names by Marine Colloids Inc. The gel mix components were mixed together and added to grapefruit juice according to the formulation set out in Example I. The completed formulation was applied to the plastic surface of the cardboard carrier and the fruit handled in the same manner as Example I with like results.

EXAMPLE IV

The gel mix of Example III was formulated in grapefruit juice in the formulation of Example II. Grapefruit halves were again inserted in a gel layer with the cut surfaces treated as in Example I. The fruit was as attractive as fresh cut fruit after shipping and storage and retained its color, taste and juice.

In the foregoing examples, reference is made to oil essence emulsion. This was prepared by mixing the following materials:

|  | G. |
|---|---|
| Uncut pectin | 2 |
| Locust bean gum | 1 |
| Sucrose | 10 |
| Water | 75 |
| Grapefruit oil essence | 6 |
| Grapefruit cold pressed oil | 6 |

Butylated hydroxy toluene was used as an antioxidant with 500 p.p.m. added to the grapefruit oil.

The addition of food coloring to the gel will not change the effectiveness of the gel and may add attractiveness to the product.

The fruit may be precooled, e.g. to 33° F. prior to applying the coating in order to accelerate gelation.

Spraying the rind of the fruit with a blend of water essence and oil essence (30–1) not only enhances the citrus odor, but markedly reduces the tendency to fungal decay on the peel. This is particularly advantageous if the peel is cut to produce a flat bottom surface on the fruit.

Normally, grapefruit halves are freshly prepared each day for the restaurant and cafeteria trade and might keep 48 hours if properly chilled. After this period, the fruit develops an old taste and the fruit shrinks and becomes unattractive. On the other hand, grapefruit halves prepared according to the examples were as good as when prepared after two weeks storage at 40° F. There was no indication of shrinkage or leakage or deterioration of taste at the end of two weeks. The fruit which had had the rind or peel sprayed with oil essence showed no fungal decay or growth on the rind.

The gel coating generally remains behind when the citrus halves are removed from the paper board and what does come along with the fruit can be easily removed by scraping if desired. The coating is edible, however, and can be left on the fruit and consumed.

While I have set out certain preferred embodiments and practices of my invention in the foregoing specification, it will be obvious that this invention may be otherwise embodied within the scope of the following claims.

I claim:

1. A prepared, edible, natural fresh citrus half of increased shelf life comprising a citrus half including the rind, said citrus half having a cut face embedded in a layer of edible gel carried on a flat non-absorbent platen, said gel layer of sufficient thickness to retain the natural juices of said citrus half against evaporation and spillage and comprising an edible hydrophilic colloid gel from the group consisting of low methoxy pectin, locust bean gum and mixtures thereof.

2. A prepared, edible citrus half of increased shelf life as claimed in claim 1 wherein the gel layer comprises an edible hydrophilic colloid containing galactan.

3. A prepared, citrus half of increased shelf life as claimed in claim 2 wherein he gel layer is formed in a suspension of citrus juice.

4. A prepared, shippable and edible citrus half as claimed in claim 1 wherein the gel layer is formed of low methoxy pectin, locust bean gum and carrageenans.

5. A prepared, shippable and edible citrus half as claimed in claim 4 wherein the gel layer is formed in a suspension of citrus juice.

6. A method of preparing a shippable and edible natural fresh citrus half comprising the steps of
   (a) cutting a citrus fruit in two halves transverse to the core to provide two cut faces,
   (b) inserting said citrus halves face down into a layer of fluid gel of a hydrophilic colloid from the group consisting of low methoxy pectin, locust bean gum and mixtures thereof carried on a flat non-absorbent surface of a carrier platen, and
   (c) solidifying said gel about the cut face on said carrier platen.

7. A method as claimed in claim 6 wherein the gel layer is an aqueous gel suspension of a hydrophilic colloid from the group consisting of low methoxy pectin, locust bean gum and mixtures thereof over said non-absorbent surface.

8. The method as claimed in claim 6 wherein the gel layer is formed from a suspension of low methoxy pectin, locust bean gum, citrus juice and sweeteners.

9. The mtheod as claimed in claim 6 wherein the rind is sprayed with citrus oil essence.

10. The method as claimed in claim 6 wherein the gel layer is formed of a suspension of low methoxy pectin, locust bean gum, carrageenans, citrus juice and sweeteners in proportions to form a gel on standing.

11. The method as claimed in claim 6 wherein the carrier platen is a sheet of corrugated paper board coated with a non-absorbent plastic.

12. The method as claimed in claim 6 wherein the carrier platen is coated with a gel layer by spraying.

13. The method as claimed in claim 6 wherein the gel layer is applied to the carrier platen at a temperature of about 165° to 180° F.

14. The method as claimed in claim 13 wherein the platen is carried on a moving conveyor beneath a spray then to a loading area and finally to a cooling and discharge area.

References Cited

UNITED STATES PATENTS

| | | | |
|---|---|---|---|
| 3,516,836 | 6/1970 | Shea | 426—99 |
| 2,611,708 | 9/1952 | Owens | 426—305 |
| 2,038,584 | 4/1936 | McIlvaine | 426—90 |

OTHER REFERENCES

Lord: Everybody's Cookbook, 1924, p. 407.

NORMAN YUDKOFF, Primary Examiner

C. P. RIBANDO, Assistant Examiner

U.S. Cl. X.R.

426—167, 170, 273, 310, 518, 102